United States Patent
Huitema

(10) Patent No.: US 8,358,275 B2
(45) Date of Patent: Jan. 22, 2013

(54) PARTIALLY FLEXIBLE DISPLAYS DEVICE

(75) Inventor: Hjalmar Edzer Ayco Huitema, Veldhoven (NL)

(73) Assignee: Creator Technology B.V., Breda (NL)

( * ) Notice: Subject to any disclaimer, the term of this patent is extended or adjusted under 35 U.S.C. 154(b) by 1283 days.

(21) Appl. No.: 11/915,365

(22) PCT Filed: May 19, 2006

(86) PCT No.: PCT/IB2006/051615
§ 371 (c)(1),
(2), (4) Date: Nov. 23, 2007

(87) PCT Pub. No.: WO2006/126158
PCT Pub. Date: Nov. 30, 2006

(65) Prior Publication Data
US 2008/0211733 A1 Sep. 4, 2008

Related U.S. Application Data

(60) Provisional application No. 60/683,648, filed on May 23, 2005.

(51) Int. Cl.
*G06F 1/16* (2006.01)
*G06F 9/30* (2006.01)
*G02F 1/1333* (2006.01)
*G02F 1/167* (2006.01)

(52) U.S. Cl. ............ 345/173; 345/1.1; 345/3.1; 345/156

(58) Field of Classification Search .................. 345/1.1, 345/3.1, 156, 173
See application file for complete search history.

(56) References Cited

U.S. PATENT DOCUMENTS

| | | | |
|---|---|---|---|
| 6,940,497 B2 * | 9/2005 | Vincent et al. | 345/204 |
| 2002/0070910 A1 * | 6/2002 | Fujieda et al. | 345/85 |
| 2003/0109286 A1 * | 6/2003 | Hack et al. | 455/566 |
| 2004/0052037 A1 * | 3/2004 | Sawyer | 361/681 |
| 2006/0192726 A1 * | 8/2006 | Huitema et al. | 345/1.1 |

FOREIGN PATENT DOCUMENTS

| | | |
|---|---|---|
| JP | 11 272205 A | 10/1999 |
| JP | 11272205 A * | 10/1999 |
| WO | WO 01/42891 A | 6/2001 |
| WO | WO 2004/053818 A | 6/2004 |
| WO | WO 2004088490 A2 * | 10/2004 |

OTHER PUBLICATIONS

PCT International Search Report for PCT/IB2006/051615 dated Oct. 31, 2006.
Written Opinion for PCT/IB2006/051615.

* cited by examiner

*Primary Examiner* — Amare Mengistu
*Assistant Examiner* — Jennifer Zubajlo

(57) ABSTRACT

The present invention provides a partially flexible display device (30) including at least one relatively flexible display region (54) and at least one relatively non-flexible display region (56); whereby the at least one relatively flexible display region (54) and the at least one relatively non-flexible display region (56) share a common base structure comprised of a plurality of layers (60-66) and the at least one relatively non-flexible display region (56) further comprises at least one additional layer (70). The at least one additional layer (70) is added to provide additional display features in the partially flexible display device (30). The additional display features may include, without limitation, a color feature, a front lighting feature, a back lighting feature and a touch sensitivity feature. In this construction, the at least one flexible region (54) and at least one non-flexible region (56) are mechanically interconnected and preferably aligned in the same dimension.

13 Claims, 5 Drawing Sheets

PARTIALLY FLEXIBLE DISPLAYS DEVICE

CROSS-REFERENCE TO RELATED APPLICATION

The present application claims priority to U.S. Provisional Patent Application Ser. No. 60/683,648 filed May 23, 2005, incorporated herein by reference.

FIELD OF THE INVENTION

This invention relates generally to partially flexible display devices, and more specifically to partially flexible display devices having regions with different flexibility.

BACKGROUND

Miniaturization and increased processing power has recently allowed great increases in the portability of electronics. Complex devices have been reduced to pocket size. Wherever they desire, consumers are able to carry and use such devices as cellular telephones, music players, game players, still and motion digital cameras, and GPS locators. Still, the size and form factor of the devices is often limited by the optical display because most devices currently use an inflexible glass optical display. Such displays are bulky, heavy, expensive, and fragile. Fragility increases with increasing display size, but limiting display size reduces the usefulness of the device. Content requiring high resolution, such as maps, cannot be shown on a small display. To obtain greater portability and avoid the drawbacks of glass optical displays, rollable displays have been developed. Rollable displays are typically made of a flexible material that can be rolled about a cylinder in a housing for storage when not in use. In one type of rollable display, the flexible material can be made from a number of sandwiched films in 3.8-inch by 3.8-inch squares containing 76,800 transistors made of organic compounds. Resting on top of the top of the 30-micron-thick stack containing one substrate and the layer of transistors—roughly one-quarter the width of a human hair—is a 200-micron-wide layer of electronic ink capsules capable of being electronically rearranged many times per second to create ever changing messages. The whole can be laminated in protective plastic. A typical thickness of the rollable displays is on the order of 0.1 millimeters, as thick as a piece of paper. Typically, the rollable displays exhibit a bend radius of less than 2 centimeters radius of curvature. In order to maintain the rollability (i.e., bend radius of less than 2 centimeters), the display must be ultra thin (having a thickness below –0.4 mm). A drawback arises when added functionality is introduced into the display. Specifically, the introduction of one or more additional display features such as, for example, color, touch sensitivity and front or backlighting to the display require additional layers and thus thickness which reduces the bend radius and prevents or limits rollability. To date, only color has been demonstrated for flexible displays.

SUMMARY OF THE INVENTION

It would be desirable to have a partially flexible or rollable display device that overcomes the above disadvantages.

One aspect of the present invention provides a partially flexible display device including at least one relatively flexible display region and at least one relatively non-flexible display region; whereby the at least one relatively flexible display region and the at least one relatively non-flexible display region share a common base structure comprised of a plurality of layers and the at least one relatively non-flexible display region further comprises at least one additional layer. The at least one additional layer is added to provide additional display features in the partially flexible display device. The additional display features may include, without limitation, a color feature, a front lighting feature, a back lighting feature and a touch sensitivity feature. In this construction, the at least one flexible region and at least one non-flexible region are mechanically interconnected and aligned in a single dimension. However, in certain embodiments, the at least one flexible region and at least one non-flexible region may be aligned in two dimensions.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIGS. 3b and 3c are more detailed cross-sectional views of the single relatively flexible region and single relatively non-flexible region of the partially flexible display of FIG. 3a;

DETAILED DESCRIPTION OF THE DRAWINGS

Figure 1:
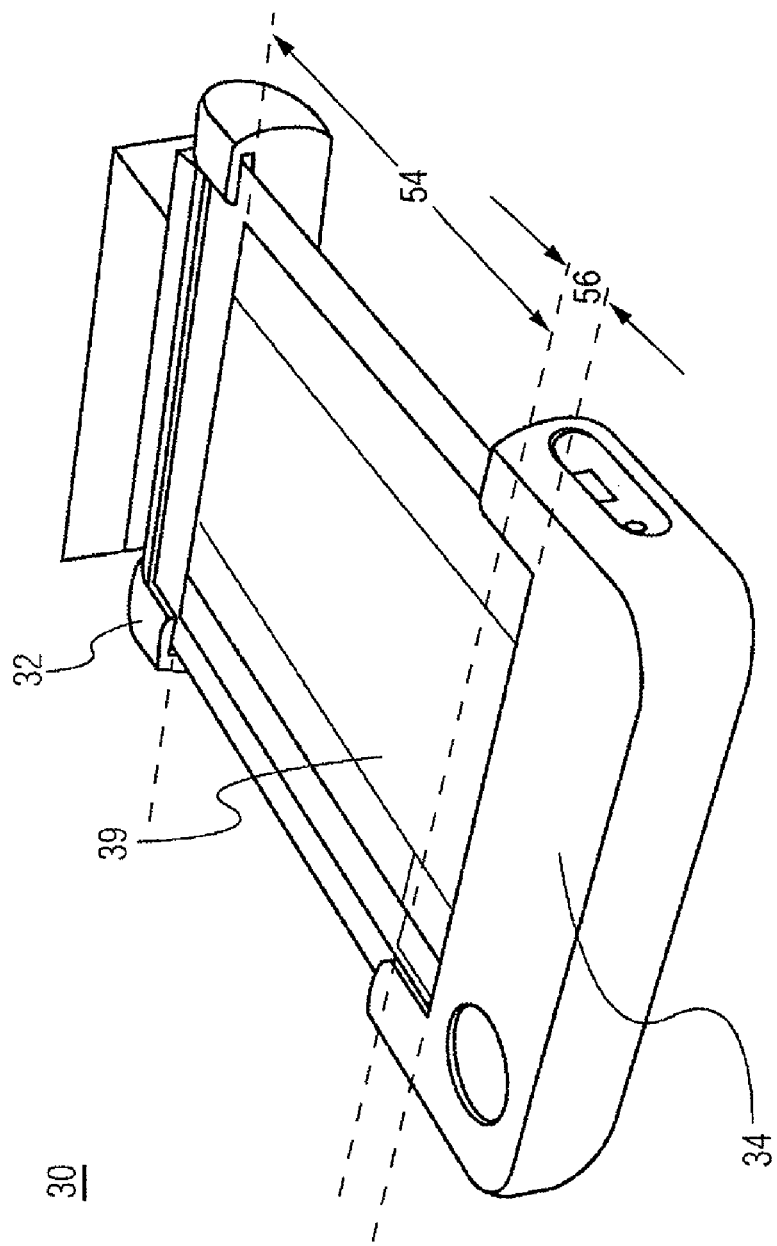
FIG. 1 is a perspective view in the extended configuration of a partially flexible or rollable display device made in accordance with one embodiment of the present invention.

One inventive principle of the present invention is a partially flexible or rollable display device. The partially flexible or rollable display includes at least one relatively flexible region and at least one relatively non-flexible region. The at least one relatively non-flexible region may be rigid. It is noted that there are no restrictions imposed on the number of flexible and non-flexible regions which comprise the partially flexible or rollable display.

In one exemplary embodiment, at least one part of the display is always visible to a user and is therefore characterized as a relatively non-flexible (i.e., not rollable) region in that it is not a rollable or foldable region, while another part of the display is visible to the user only when the display is in a fully or partially extended state and is therefore characterized as a relatively flexible (i.e., rollable) region. These latter regions are foldable or rollable. The relatively non-flexible region(s) serve as regions suited to accommodate added display features such as, for example, color, front and back lighting and touch sensitivity. These relatively non-flexible region(s) have a cross-sectional thickness that is greater than the cross-sectional thickness of the flexible regions by virtue of one or more additional layers which serve to accommodate the added display features.

It should be appreciated that while the partially flexible or rollable display of the present invention is comprised at least one relatively flexible region and at least one relatively non-flexible region, the display is preferably manufactured as a single factory piece whereby the at least one relatively flexible region is mechanically interconnected to the at least one relatively non-flexible region. During a manufacturing process, the relatively flexible and relatively non-flexible regions are preferably aligned in the same direction (along the same axis) so as to prevent flexing or rolling in two dimensions which may result in buckling of the display.

The present invention also does not impose any limitations or restrictions on the structural configuration and material composition of a partially flexible display of the present invention. In one embodiment, a partially flexible display can be provided by Polymer Vision, which has a layered rollable display consisting of a back layer of a thin/organic film serving as a base, a middle layer of organic electronics serving as an active matrix for driving the images of the rollable display, and a top layer of an electronic ink printed or otherwise disposed on a plastic sheet. The layered flexible display provided by Polymer Vision can be suitably modified to include various display features. Such features may be introduced by suitably modifying regions of the flexible display to add additional layers constructed in a manner to accommodate the various display features. The regions of the partially flexible or rollable display accommodating such features necessarily have a reduced bend radius by virtue of the additional features and thereby constitute relatively non-flexible regions of the partially flexible or rollable display.

In practice, the specific implementations of a partially flexible or rollable display of the present invention are dependent upon the commercial implementations of the present invention, and are therefore without limit.

Figure 2:
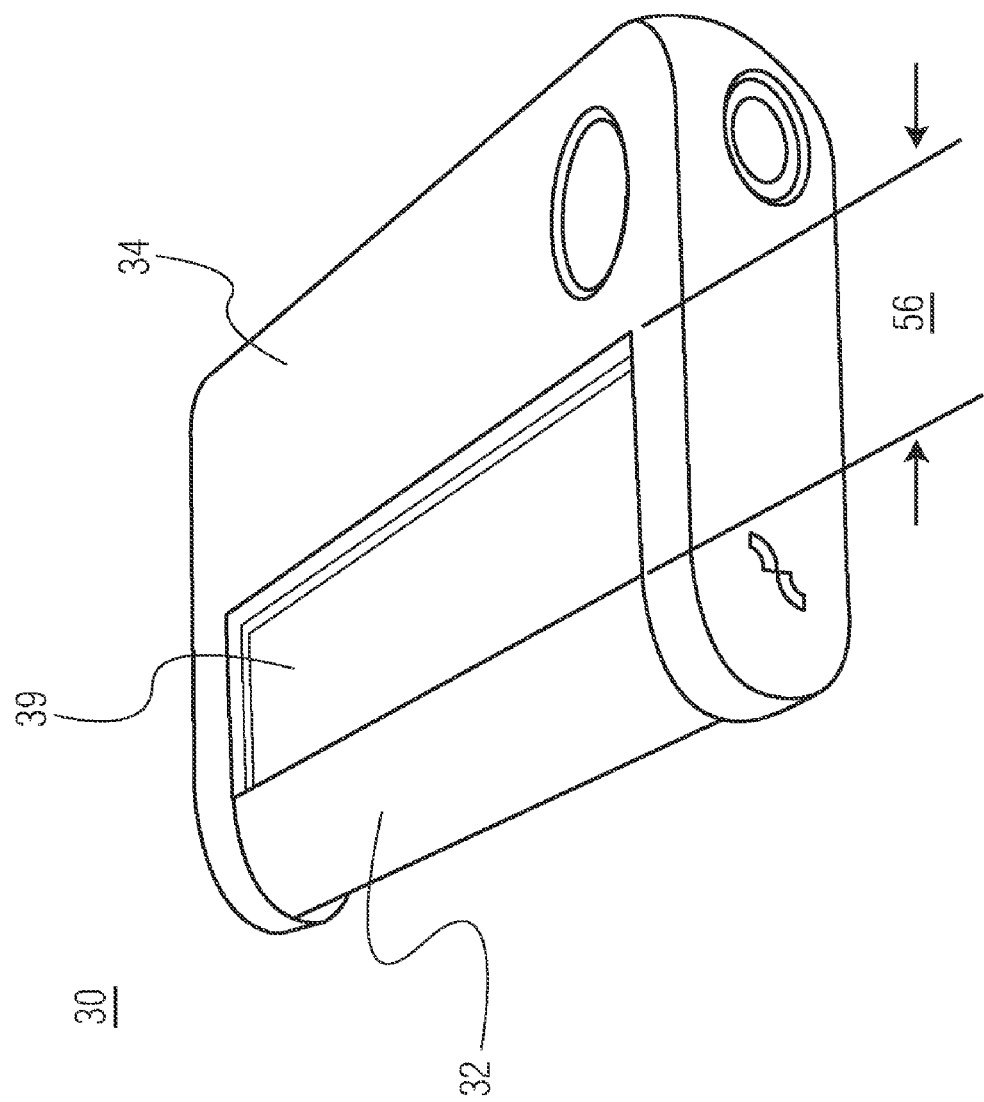
FIG. 2 is a perspective view in the rolled configuration of a partially flexible or rollable display device made in accordance one embodiment of the present invention.

The following descriptions of FIGS. 1-3 provide exemplary embodiments of a partially flexible or rollable display unit of the present invention incorporating the aforementioned first inventive principle of the present invention.

FIGS. 1-3, in which like elements share like reference numbers, are views of a partially flexible display device made in accordance with one embodiment of the present invention.

As shown in FIG. 1, the partially flexible display device 30 has an extended configuration in which the device 30 is rolled out or "extended" to display information to the user. As used herein, the terms "extended" and "extended configuration" are defined as the configuration in which the housings of the device 30 are separated and the viewing portion 39 of the device 30 is extended in which both the relatively flexible region 54 and relatively non-flexible region 56 are visible to the user. The viewing portion 39 of the device 30 is comprised of a relatively flexible region 54 and a relatively non-flexible region 56. Other embodiments may include additional flexible and/or non-flexible regions. The relatively non-flexible region 56 may be characterized by the added display functionality it provides which is not available in the relatively flexible region 54. The added display functionality may be, for example, a color feature, a touch layer feature, a front-lighting feature or a backlighting feature.

Figure 3A:
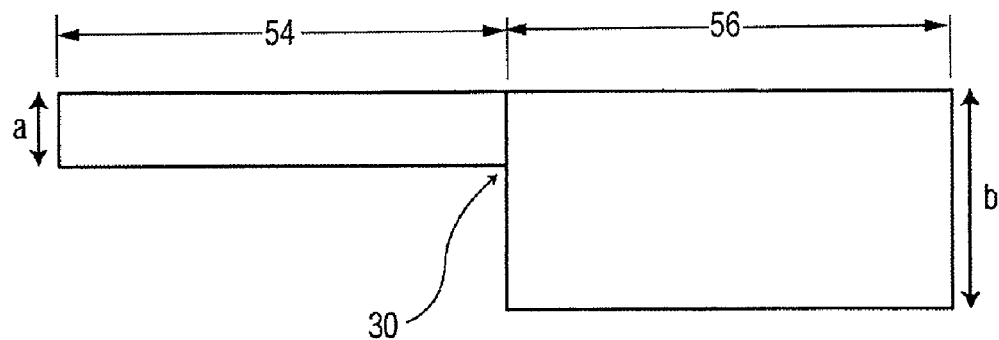
FIG. 3a is a cross sectional view of a partially flexible or rollable display device comprising a single relatively flexible region and a single relatively non-flexible region in accordance one embodiment of the present invention.

The added functionality provided in the relatively non-flexible region 56 introduces an additional thickness to the non-flexible region 56 (as shown in FIG. 3a) due to one or more additional layers required to implement the added feature(s). The relatively non-flexible region 56 may be characterized as relatively non-flexible by virtue of having a bend radius in excess of approximately 2 centimeters. A bend radius of approximately 2 centimeters is commonly accepted in the art as a threshold bend radius for characterizing a region as flexible or non-flexible. It should be appreciated that any reduction in bend radius prevents or limits flexibility or rollability.

As shown In FIG. 2, the partially flexible display 38 has a rolled configuration in which the device 30 is partially rolled away within the housings 32, 34 for portability and protection. In the rolled configuration, the viewing portion 39 of the device 30 is comprised exclusively of the relatively non-flexible region 56. The terms "rolled" and "rolled configuration" are defined as the configuration in which the housings of the device 30 are joined and the viewing portion 39 of the device 30 is rolled for storage whereby only the relatively non-flexible region 56 is visible to the user.

The device 30 can be any electronic device displaying information, such as a global positioning system (GPS) receiver, a mobile telephone, a personal digital assistant (PDA), an eBook reader, a laptop and the like.

The display 39 can be any flexible partially rollable display able to display graphical information, such as electronic paper, electrophoretic displays, OLED displays, polyLED displays, LC displays, electrowetting displays, rotating ball displays, direct drive displays, segmented displays, passive-matrix displays or active-matrix displays or the like.

Figure 3B:
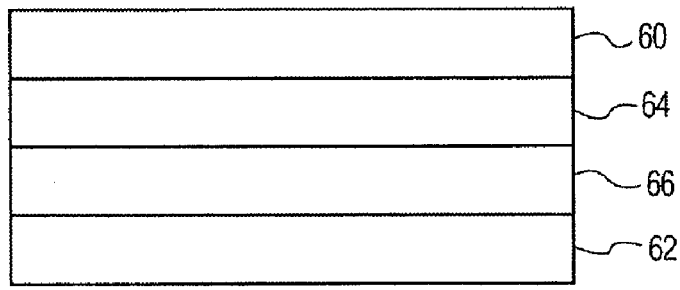

Referring to FIG. 3a, a cross sectional view of the device 30 is shown having a single flexible region 54 having a corresponding thickness "a" and a single non-flexible region 56 having a corresponding thickness "b". The thickness "b" being greater than the thickness "a" by virtue of the addition of one or more additional layers 70 (as shown in FIG. 3b). As shown in FIG. 3a, the change in thickness at a transition point 30 is abrupt.

Figure 3C:
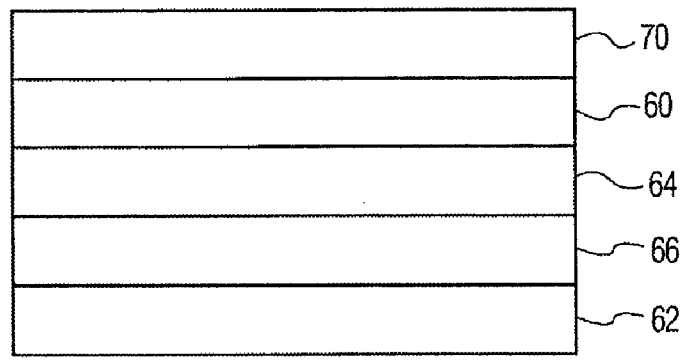

FIGS. 3b and 3c are more detailed cross-sectional views of the single relatively flexible region 54 and single relatively non-flexible region 56 shown in FIG. 3a. As shown in FIG. 3b, the single relatively flexible region 54 of FIG. 3a includes a top plastic substrate 60 and a corresponding bottom plastic substrate 62, each substrate being on the order of 25 microns. The top and bottom substrates 60, 62 encapsulate an electrophoretic layer 64 and an active matrix layer 66. The electrophoretic layer 64 is further comprised of a capsule/binder layer and a glue layer (not shown) and the active matrix layers 66 is further comprised of a semiconductor layer and metallization layers interlaced with insulator layers (not shown).

Referring now to FIG. 3c, there is shown a detailed cross-sectional view of a single non-flexible region 56 which is identical to the single flexible region in most respects with the exception of an additional layer 70 on an upper surface of the top plastic substrate 60. The addition of an additional layer 70 changes the character of the region from a relatively flexible region to a relatively non-flexible region by virtue of the added thickness which serves to reduce the bend radius proportionately.

The Table lists four exemplary display features that can be considered for inclusion in the partially flexible as an additional layer 70. The table also describes options available for certain of the proposed added display features. The four features described include: a color filter feature, a touch layer feature, a front-lighting feature and a backlighting feature. Of course, as technology changes, other features may be preferable in the future. The third column of the Table describes various options for applying the features to the device as additional layer 70. For example, two options are described for the color feature at rows 1 and 2 of the Table. It is noted, however, that irrespective of which option is selected, the additional layer 70 to a region of the display device characterizes that region as relatively non-flexible as compared with other regions of the display device that do not incorporate such features.

TABLE

| FEATURE | OPTION | DESCRIPTION |
|---|---|---|
| Color feature | 1 | Apply red, green and blue pigments directly to the top substrate in three photolythography steps |
| | 2 | Apply a color filter attached to a carrier film by lamination. This can be a plastic film or a glass substrate. |
| Touch Layer feature | 1 | Resistive Touch - Apply a conductor on top of the top substrate and apply spacers, a few microns thick, on top of the conductor. |
| | 2 | Capacitive Touch |
| | 3 | Optical Touch |
| Frontlighting - for reflective displays | 1 | Use the upper substrate as a light guide and couple the light from one or more sides of the substrate. Apply outcoupling structures on top of the substrate where the light must be coupled out of the substrate. |
| | 2 | Apply a complete lightguide with possible outcouple structures on top of the top substrate. |
| Backlighting - for transmissive displays | 1 | The same option can be used as that described for frontlighting, with the difference being the additional layers must be applied under the bottom substrate. |

Figure 4A:
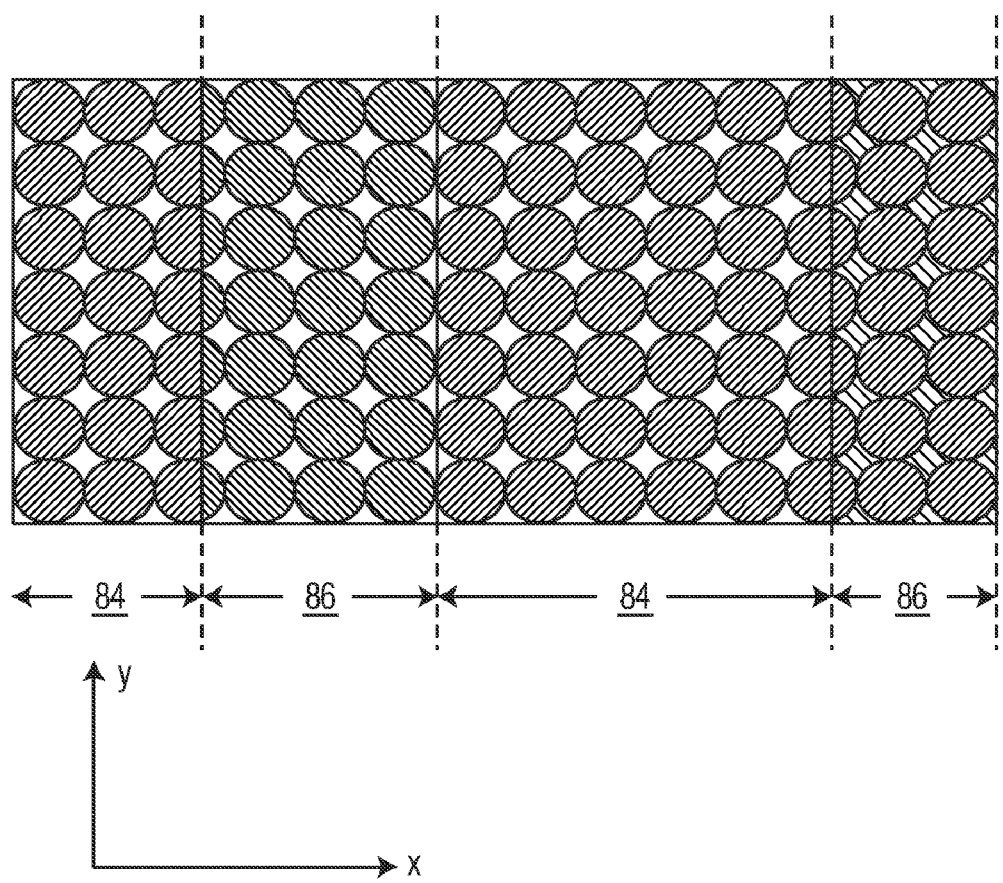
FIGS. 4a & 4b are respective top and side views of a partially rollable display aligned in a single dimension.
Figure 4B:
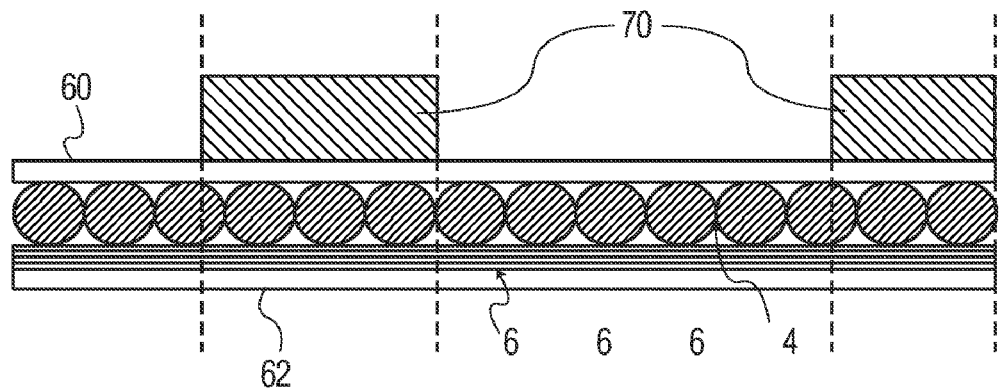

FIGS. 4a and 4b are respective top and side views of a partially rollable display aligned in a single dimension. FIGS. 4a and 4b show, by way of example, two relatively flexible regions 84 and two relatively non-flexible regions 86 aligned in a single dimension. The two relatively non-flexible regions being defined by the respective additional layers 70 (e.g., color filter, touch layers, light guide), as shown in the side view of FIG. 4b. Specifically, the two relatively non-flexible regions 86 are aligned with respect to the two relatively flexible regions 84 in a single dimension, i.e., the X-dimension as shown.

Figure 5A:
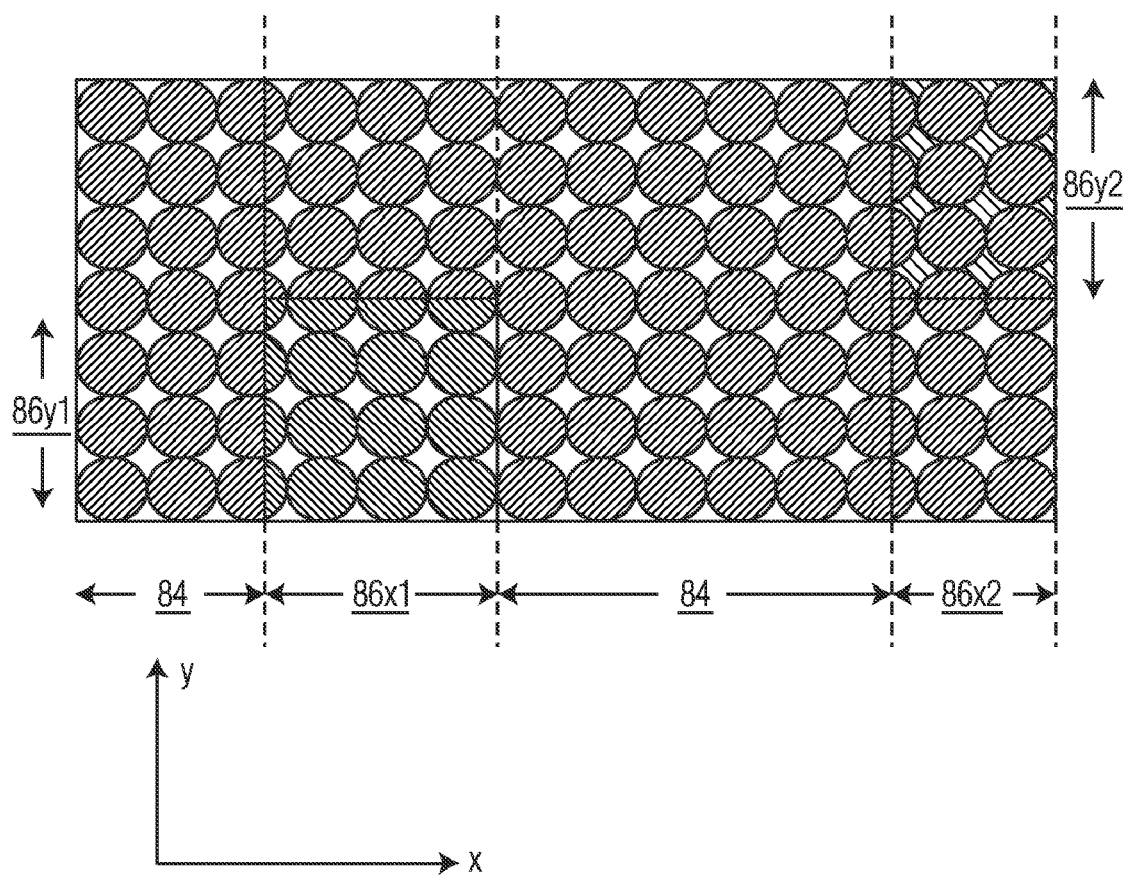
FIGS. 5a & 5b are respective top and side views of a partially rollable display aligned in two dimensions.
Figure 5B:
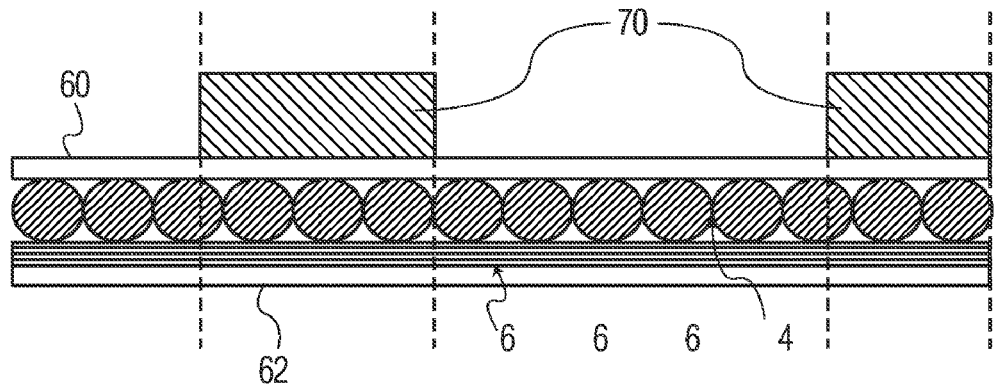

FIGS. 5a and 5b are respective top and side views of a partially rollable display aligned in two dimensions. FIGS. 5a and 5b show, by way of example, two relatively flexible regions 84 and two relatively non-flexible regions 86 aligned in the x and y dimensions. The two relatively non-flexible regions 86 being defined by the respective additional layers 70 (e.g., color filter, touch layers, light guide), as shown in the side view of FIG. 5b. The first relatively non-flexible region 86 is defined by the coordinate 86x1 in the first or x-dimension and by the coordinate 86y1 in the second or y-dimension. Similarly, the second relatively non-flexible region 86 is defined by the coordinate 86x2 in the x-dimension and by the y-coordinate 86y2 in the y-dimension. It is also contemplated that alignment of the at least one flexible region 84 with the at least one non-flexible regions 86 may also be performed in higher dimensions in other embodiments (i.e., three or more).

From the preceding description of the present invention, those having ordinary skill in the art will appreciate various advantages of the present invention. In particular, a partially flexible or rollable display device is constructed to include at least one relatively flexible region and at least one relatively non-flexible region. The at least one relatively flexible region is included primarily, but not exclusively, for purposes of achieving a highest degree of a device portability. The at least one relatively non-flexible region is included primarily, but not exclusively, for purposes of incorporating additional display features in the display device such as color, front and back lighting and touch sensitivity.

Although this invention has been described with reference to particular embodiments, it will be appreciated that many variations will be resorted to without departing from the spirit and scope of this invention as set forth in the appended claims. The scope of the invention is indicated in the appended claims, and all changes that come within the meaning and range of equivalents are intended to be embraced therein. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts is intended to be required unless specifically indicated.

The invention claimed is:

1. A partially flexible display device comprising:
at least one first flexible multilayer structure for displaying; and
at least one second flexible multilayer structure for displaying;
wherein the first flexible multilayer structure for displaying and the second flexible multilayer structure for displaying share a common base structure comprising a plurality of layers,
the second flexible multilayer structure for displaying further comprises at least one additional layer, such that the second flexible multilayer structure for displaying is less flexible than the first flexible multilayer structure for displaying, and
the at least one additional layer is constructed to provide at least one other display feature for use with the partially flexible display device.

2. The partially flexible display device of claim 1, wherein the display feature is a color feature.

3. The partially flexible display device of claim 1, wherein the display feature is a touch sensitivity feature.

4. The partially flexible display device of claim 1, wherein the display feature is a front lighting feature.

5. The partially flexible display device of claim 1, wherein the display feature is a back lighting feature.

6. The partially flexible display device of claim 1, wherein the first flexible multilayer structure for displaying and the second flexible multilayer structure for displaying are mechanically interconnected or mechanically interconnectable.

7. The partially flexible display device of claim 1, wherein the first flexible multilayer structure for displaying is rollable or foldable with respect to a common axis.

8. The partially flexible display device of claim 1, wherein the first flexible multilayer structure for displaying and the second flexible multilayer structure for displaying are manufactured as a single composite structure.

9. The partially flexible display device of claim 1, wherein the first flexible multilayer structure for displaying and the second flexible multilayer structure for displaying are aligned in a single dimension.

10. The partially flexible display device of claim 1, wherein the first flexible multilayer structure for displaying and the second flexible multilayer structure for displaying are aligned in two dimensions.

11. The partially flexible display device of claim 1, wherein the at least one additional layer is fixed to the common base structure to form the second flexible multilayer structure for displaying.

12. The partially flexible display device of claim 1, wherein the additional layer is constructed to change the bend radius of the second flexible multilayer structure for displaying relative to the first flexible multilayer structure for displaying.

13. The partially flexible display device of claim 1, wherein the second flexible multilayer structure is thicker than the first flexible multilayer structure by virtue of the at least one additional layer.

* * * * *